(12) United States Patent
Lehmann

(10) Patent No.: US 12,068,666 B2
(45) Date of Patent: Aug. 20, 2024

(54) DRIVE UNIT AND DRIVE ASSEMBLY

(71) Applicant: Schaeffler Technologies AG & Co. KG, Herzogenaurach (DE)

(72) Inventor: Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 235 days.

(21) Appl. No.: 17/782,176

(22) PCT Filed: Nov. 5, 2020

(86) PCT No.: PCT/DE2020/100945
§ 371 (c)(1),
(2) Date: Jun. 3, 2022

(87) PCT Pub. No.: WO2021/110199
PCT Pub. Date: Jun. 10, 2021

(65) Prior Publication Data
US 2023/0043424 A1 Feb. 9, 2023

(30) Foreign Application Priority Data
Dec. 4, 2019 (DE) .................... 10 2019 132 942.6

(51) Int. Cl.
*H02K 9/19* (2006.01)
*H02K 5/20* (2006.01)
(Continued)

(52) U.S. Cl.
CPC ............... *H02K 9/19* (2013.01); *H02K 5/203* (2021.01); *H02K 5/24* (2013.01); *H02K 7/003* (2013.01);
(Continued)

(58) Field of Classification Search
CPC .......... H02K 9/19; H02K 5/203; H02K 5/24; H02K 7/003; H02K 7/006; H02K 7/108;
(Continued)

(56) References Cited

U.S. PATENT DOCUMENTS

| | | | | |
|---|---|---|---|---|
| 4,864,173 A | * | 9/1989 | Even | H02K 49/043 188/161 |
| 7,402,923 B2 | * | 7/2008 | Klemen | B60K 6/48 310/58 |

(Continued)

FOREIGN PATENT DOCUMENTS

| | | |
|---|---|---|
| CN | 105896855 A | 8/2016 |
| CN | 107215196 A | 9/2017 |

(Continued)

*Primary Examiner* — Ahmed Elnakib

(57) ABSTRACT

A drive unit has a first electric rotary machine and a second electric rotary machine as well as a first shaft and a second shaft. The first electric rotary machine is arranged at least partly radially and axially within an area radially delimited by the second electric rotary machine, and the stator of the first electric rotary machine and the stator of the second electric rotary machine are mechanically fixed to each other. The drive unit comprises a coolant supply device which is arranged adjacently to the stators in the axial direction and by means of which coolant can be supplied axially between and/or into the stators.

12 Claims, 6 Drawing Sheets

(51) Int. Cl.
*H02K 5/24* (2006.01)
*H02K 7/00* (2006.01)
*H02K 7/108* (2006.01)
*H02K 7/116* (2006.01)

(52) U.S. Cl.
CPC ............. *H02K 7/006* (2013.01); *H02K 7/108* (2013.01); *H02K 7/116* (2013.01)

(58) Field of Classification Search
CPC ........... H02K 7/116; H02K 5/20; H02K 7/10; H02K 16/02; H02K 9/193; Y02T 10/62; B60K 2001/006; B60Y 2200/92
USPC .................................... 210/54, 112, 113, 114
See application file for complete search history.

(56) References Cited

U.S. PATENT DOCUMENTS

| | | | |
|---|---|---|---|
| 8,207,644 B2* | 6/2012 | Himmelmann | H02K 9/19 |
| | | | 310/112 |
| 2009/0127946 A1* | 5/2009 | Fee | H02K 5/203 |
| | | | 310/64 |
| 2014/0246177 A1 | 9/2014 | Chamberlin et al. | |
| 2015/0280525 A1 | 10/2015 | Rippel et al. | |
| 2016/0099636 A1 | 4/2016 | Fricasse | |
| 2016/0164377 A1 | 6/2016 | Gauthier et al. | |
| 2016/0218584 A1 | 7/2016 | Fukushima et al. | |
| 2017/0070106 A1* | 3/2017 | Guo | H02K 1/187 |
| 2023/0041635 A1 | 2/2023 | Lehmann | |
| 2023/0043424 A1* | 2/2023 | Lehmann | H02K 9/19 |

FOREIGN PATENT DOCUMENTS

| | | |
|---|---|---|
| CN | 108736653 A | 11/2018 |
| DE | 102014102632 A1 | 9/2014 |
| DE | 102016116033 A1 | 3/2017 |
| DE | 112015006071 T5 | 10/2017 |
| JP | 2000014086 A | 1/2000 |
| JP | 2003339102 A | 11/2003 |
| JP | 2004364428 A | 12/2004 |
| KR | 20130027512 A | 3/2013 |
| WO | 2019026673 A1 | 2/2019 |
| WO | 2019101264 A1 | 5/2019 |

* cited by examiner

DRIVE UNIT AND DRIVE ASSEMBLY

CROSS-REFERENCE TO RELATED APPLICATIONS

This application is the U.S. National Phase of PCT Appln. No. PCT/DE2020/100945 filed Nov. 5, 2020, which claims priority to DE 102019132942.6 filed Dec. 4, 2019, the entire disclosures of which are incorporated by reference herein.

TECHNICAL FIELD

The disclosure relates to a drive unit for a powertrain of an electrically drivable motor vehicle, in particular a hybrid motor vehicle, and to a drive assembly.

BACKGROUND

Various drive units integrated in drive assemblies or powertrains are known from the prior art.

DE 11 2015 006 071 T5 discloses a hybrid vehicle drive system with a generator capable of generating electrical energy using the power of an internal combustion engine; an electric motor driven by electrical energy to drive wheels; a housing accommodating the generator and the electric motor; and a power control unit for controlling the generator and the electric motor. The generator and the electric motor are arranged side by side on the same axis in the housing.

US 2016/0218584 A1 describes a control unit which is used to control electric machines, wherein the control unit is mounted on a housing of the drive unit comprising the electric machines. The drive unit comprises two electric machines which are arranged coaxially and axially adjacent to one another.

WO 2019 101 264 A1 discloses a powertrain for a hybrid motor vehicle. The powertrain comprises a gearbox input shaft which is operatively connected to a first electric machine and an internal combustion engine via a first sub-powertrain so as to transmit torque and which is operatively connected to a second electric machine via a second sub-powertrain so as to transmit torque. The two electric machines are arranged coaxially and axially adjacent to one another.

SUMMARY

Integrating a drive unit with a plurality of electric rotary machines in a drive assembly intended for a hybrid motor vehicle is subject to strict installation space requirements, in particular in the axial direction.

An axially particularly short drive assembly is advantageous, in particular when such a drive unit is used in so-called front-transverse arrangements in motor vehicles, in which the electric rotary machines and the internal combustion engine are used as front drives and a respective axis of rotation of an electric rotary machine and the internal combustion engine is arranged transverse to the longitudinal direction of the motor vehicle.

Cooling of the electric rotary machines is often required. For example, it is known to provide a first flow system for realizing a flow of a first fluid for at least partially cooling at least one electric rotary machine, and to provide a second flow system for realizing a flow of a second fluid, wherein heat is transferable from the first flow system to the second flow system via a heat exchanger.

The first fluid can also serve to cool both electric rotary machines and flow through the drive unit in such a manner that at least one outlet of the first flow system directs the cooling fluid to the first electric rotary machine, and at least one other outlet of the first flow system directs the cooling fluid to the second electric rotary machine. Due to the axial side by side arrangement of the electric rotary machines, the outlet for cooling the first electric rotary machine is clearly spaced apart in the axial direction from the further outlet for cooling the second electric rotary machine.

Based on this, the present disclosure is based on the object of providing a drive unit and a drive assembly equipped with it, which ensure optimum cooling and thus efficient operation in an inexpensive design and in a space-saving manner.

The object is achieved by the drive unit according to the disclosure. Advantageous embodiments of the drive unit are described herein.

In addition, a drive assembly having the drive unit is provided according to the disclosure.

The features of the claims may be combined in any technically useful way, including the explanations from the following description and features from the figures which comprise additional embodiments of the disclosure.

In the context of the present disclosure, the terms "axial" and "radial" always refer to the axis of rotation of the drive unit, which corresponds to the axis of rotation of at least one of the electric rotary machines comprised by the drive unit.

The disclosure relates to a drive unit for a powertrain of an electrically drivable motor vehicle, in particular a hybrid motor vehicle, having a first electric rotary machine and a second electric rotary machine and a first shaft and a second shaft, wherein a rotor of the first electric rotary machine is connected in a non-rotatable manner to the first shaft and a rotor of the second electric rotary machine is connected in a non-rotatable manner to the second shaft. The first electric rotary machine is arranged at least partly radially as well as axially within an area radially delimited by the second electric rotary machine. The first electric rotary machine is designed as an internal rotor motor and the second electric rotary machine is designed as an external rotor motor, wherein the stator of the first electric rotary machine and the stator of the second electric rotary machine are mechanically fixed to each other. The drive unit comprises a coolant supply device which is arranged adjacently to the stators in the axial direction and by means of which coolant can be supplied axially between and/or into the stators.

This means that the stators of the two electric rotary machines are arranged radially between the rotors of the two electric rotary machines.

In one embodiment, it can be provided that the radially inner electric rotary machine is arranged radially as well as axially completely within an area radially delimited by the respective other electric rotary machine.

In particular, it is provided that the drive unit further comprises a separating clutch with which the rotor of the first electric rotary machine is connectable or connected to the second shaft for torque transmission.

The separating clutch is arranged in a torque transmission path extending from the first electric rotary machine to the second shaft, or is arranged to open and close this torque transmission path. The drive unit can comprise an actuation system for actuating the separating clutch, wherein a release bearing of the actuation system can be implemented in single row or double row.

Advantageously, the axes of rotation of the rotors of the electric rotary machines are positioned coaxially.

The radial nesting of the two electric rotary machines results in the advantage that, during the manufacture of the individual metal sheets of the rotor package and the stator package of both electric rotary machines, a metal sheet of both the rotor of the radially inner electric rotary machine and the stator of the radially inner electric rotary machine and also the stator of the radially outer electric rotary machine as well as the rotor of the radially outer electric rotary machine can be cut out from a blank with a punching stroke.

For the purpose of its connection to the second shaft, the rotor of the radially outer electric rotary machine can be supported by a rotor carrier which is connected to the second shaft, wherein the rotor is in particular connected to the rotor carrier in a force-fitting and/or form-fitting manner and the rotor carrier is connected to the second shaft in a force-fitting and/or form-fitting manner.

For rotatably mounting the first shaft and/or the second shaft, the drive unit can have a central bearing or bearing unit, which is designed to consist of one or more parts and by means of which the first shaft and/or the second shaft are mounted on a housing of the drive unit. The rotor carrier of the radially outer electric rotary machine can be supported directly via the central bearing or indirectly via the second shaft on the central bearing. The central bearing is designed, for example, as a roller, ball or angular contact ball bearing.

The drive unit may comprise a fastening element bolted to the first or second shaft for securing the position of the rotor carrier of the radially outer electric rotary machine with respect to the position of the second shaft.

Advantageously, the radially inner electric rotary machine can be operated as a generator. The rotor of the radially inner electric rotary machine is relatively small and thus has a lower mass moment of inertia than the rotor of the radially outer electric rotary machine.

Accordingly, the radially outer electric rotary machine can advantageously be used as a drive unit, since the rotor of this electric rotary machine is relatively large and can generate a correspondingly large torque.

This does not rule out the possibility of using both the radially inner electric rotary machine and the radially outer electric rotary machine for the purpose of driving a motor vehicle equipped with the drive unit. For example, the radially inner electric rotary machine can be used to supply torque to an input side of the drive unit so that a startup of an internal combustion engine connectable to the input side can be realized. Alternatively, one or both electric rotary machines can also provide torque and, together with a connected internal combustion engine, realize a hybrid operation of the drive unit.

In one embodiment, the rotor of the first electric rotary machine is arranged within an area radially delimited by the stator of the second electric rotary machine.

In one embodiment of the drive unit, the stators of the two electric rotary machines are arranged on a common stator carrier, wherein coolant can be supplied to the stator carrier by means of the coolant supply device and the former is designed to distribute the coolant in the axial direction.

Accordingly, it is provided here that the two stators are arranged radially on both sides of the stator carrier.

In this case, the distribution in the axial direction is not limited to generating a volumetric flow with only an axial component, but a coolant volumetric flow can be generated by the stator carrier that is axially extending with at least one directional component.

The stator carrier is, in turn, fixed to a housing of the drive unit.

In particular, this stator carrier can be arranged between the stators of the two electric rotary machines with regard to its radial position and be mechanically connected to them, so that the stator carrier fixes both stators.

The stator carrier can form a helical channel on its radially inner side and/or on its radially outer side for conducting coolant.

The stator carrier is a component with an essentially hollow cylindrical shape and thus has a radially inner side and a radially outer side. The channel can be formed by a groove on the respective side of the stator carrier, which is closed on the outside when the respective stator package or its body is in contact with the respective side of the stator carrier, thus forming a channel.

When a helical channel is arranged both on the radially inner side and on the radially outer side of the stator carrier, at least one radial connecting channel can be provided between the helical channel on the radially inner side and the helical channel on the radially outer side.

This embodiment provides efficient cooling of both stators through grooves or channels formed in the stator carrier.

Furthermore, the coolant supply device can comprise a distribution device arranged axially adjacent to the electric rotary machines for supplying coolant to the stator carrier, wherein the distribution device is fluidically coupled by means of at least one connecting sleeve to at least one connecting channel formed axially in the stator carrier.

The axial connecting channel is, in turn, fluidically connected to the helical channel.

When a plurality of axial connecting channels are arranged, they are fluidically coupled with a plurality of helical channels.

The distribution device can be implemented by an annular channel formed in or on a housing of the drive unit.

In particular, the distribution device is an integral component of a housing to which the stator carrier is fixed.

In an alternative embodiment of the coolant supply device, instead of a connecting sleeve it can be provided that the stator carrier is in contact with the housing forming the distribution device in such a manner that the distribution device and the connecting channel formed axially in the stator carrier are essentially directly fluidically coupled to one another. Advantageously, a seal, for example formed as a sealing ring, should be arranged between the stator carrier and the housing forming the distribution device so that the fluidic connection between the distribution device and the connecting channel is sealed off from the environment.

In an alternative embodiment of the present drive unit, the stators of the two electric rotary machines are integral components of a stator unit, wherein the coolant supply device comprises an annular channel having a plurality of axial outlets generating partial coolant flows to which flow channels in at least one of the stators are fluidically coupled.

Such a flow channel can be implemented by an axial bore in a respective stator.

In particular, such flow channels are arranged radially between the stator of the first electric rotary machine and the stator of the second electric rotary machine. This means that coolant is guided in the stator unit in such a manner that optimum cooling of both stators is realized in an essentially equal manner.

The annular channel can be realized by a plastic part. In particular, the annular channel corresponds to an annular tube. It can also be provided that the annular channel is formed as an integral component of a housing.

The stator unit can, in turn, be fixed to a housing of the drive unit. Thus, this alternative embodiment does not utilize an extra stator carrier between the individual stators, but rather comprises a compact unit formed solely by the two stators.

The stator unit can be fixed to a housing of the drive unit by a plurality of screw connections. A respective screw of a screw connection is passed through the stator unit, in particular in the axial direction, and screwed into a housing of the drive unit.

In one embodiment, the drive unit comprises a first housing and a second housing, which together define a housing interior in which the two electric rotary machines are arranged and in which the first shaft and the second shaft are at least partly arranged.

In particular, a common stator carrier or a stator unit is mechanically connected to the first housing, wherein the rotors of the two electric rotary machines are supported on the second housing.

In particular, the second shaft can be supported on the second housing, wherein the first shaft can be supported on the first housing and the second shaft.

In addition, power electronics for controlling the electric rotary machines can be carried by the second housing.

Furthermore, the first shaft can have an axially extending shaft flow channel, which is adjoined by at least one first transverse bore with a radial extension through which coolant can be supplied from the shaft flow channel to the rotor of the first electric rotary machine.

In particular, at least one first transverse bore can be superimposed in the radial direction by the rotor of the first electric rotary machine, so that this rotor can be optimally cooled by the coolant. Advantageously, an axially extending cooling channel is provided in the radial direction between the first shaft and the rotor, which is fluidically coupled to the at least one first transverse bore so that coolant flowing to the rotor between the two axial end faces of the rotor is distributed as uniformly as possible over the axial extent of the rotor.

In one embodiment, the first shaft may have a plurality of first transverse bores with a radial extension, wherein it is provided that the first transverse bores terminate at regular angular intervals from one another circumferentially and a group of first transverse bores has a substantially identical axial position. This axial position can correspond in particular to an axially central position in relation to the rotor.

In particular, it can be provided that at least a first transverse bore is superimposed in the radial direction by a first rotor carrier for rotatably arranging the rotor of the first electric rotary machine, wherein said first rotor carrier comprises grooves and/or bores for axially distributing the coolant in or at the rotor of the first electric rotary machine.

According to a further embodiment, the rotor of the second electric rotary machine is rotatably mounted by means of a rotor carrier, wherein this rotor carrier has grooves and/or bores for axial distribution of the coolant in or on the rotor of the second electric rotary machine.

Alternatively or additionally, it can be provided that the rotor of the second electric rotary machine has grooves and/or bores for the same purpose.

The coolant is carried in particular by centrifugal force radially outer to the rotor of the second electric rotary machine, wherein the coolant thereby preferably flows along a radial section of the substantially pot-shaped rotor carrier.

In addition, the coolant collects in the pot-shaped rotor carrier due to gravity and is then distributed along the circumference as the rotor carrier rotates.

In particular, it is provided that grooves are formed at a radial position radially outer on the rotor of the second electric rotary machine and/or are formed on the contact surface of the rotor of the second electric rotary machine on the rotor carrier. Bores in the rotor can be realized radially further inside the rotor in relation to the grooves, whereby the bores are closer to the area of greatest heat generation than the grooves, so that coolant guided in such bores can realize a more efficient cooling effect.

Furthermore, at least one additional transverse bore can be formed in the first shaft for the outflow of coolant axially adjacent to the electric rotary machines.

The coolant flowing out of the at least one further transverse bore can be used, for example, to realize cooling of the separating clutch and/or cooling of bearings, such as the central bearing unit.

In particular, a plurality of further transverse bores can be formed, wherein this plurality of further transverse bores is distributed on the same axial position on the circumference and/or arranged on different axial positions. Another transverse bore can also be used to dispense coolant for the purpose of cooling the rotor of the second electric rotary machine.

The stator carrier or individual flow channels in the stators can have at least one outlet directed at the winding heads of the relevant stator in order to enable cooling of winding heads of the stator by means of a fluid volume flow exiting from the stator carrier or a stator itself.

The two shafts of the drive unit are advantageously arranged coaxially.

For this purpose, it is provided that the second shaft is designed as a hollow shaft and the first shaft runs in sections inside the second shaft.

Further, the drive unit can comprise a first transmission stage, wherein the first transmission stage is formed by a connection element of the drive unit comprising an internally toothed gear wheel and the first shaft comprising an element having an external toothing. The toothing of the internally toothed gear wheel and the external toothing mesh with each other to transmit the rotary motion from the connection element to the first shaft.

Accordingly, the drive unit according to the disclosure is designed as a so-called hybrid gearbox. This means, therefore, that in addition to the electric rotary machines and the shafts, the drive unit also comprises a gearbox.

In particular, the element with the external toothing can be a gear wheel arranged in a non-rotatable manner on the first shaft.

In addition, the drive unit can have a second transmission stage, which is formed by a toothing, in particular an external toothing, of the second shaft and a first gear wheel meshing with the toothing of the second shaft.

In one embodiment in which the drive unit comprises a gearbox, the first gear wheel can be coupled to an intermediate shaft of the gearbox in a non-rotatable manner.

This gearbox may comprise a differential gear in the output section. In this case, an external toothing of the intermediate shaft can mesh with an input gear wheel of the differential gear, thus realizing a third transmission stage.

The second shaft thus functions here as a gearbox input shaft and is in operative connection with the gearbox, so that a torque provided by the second shaft or the rotary motion realized by the second shaft can be transmitted via the gearbox to a further gearbox unit of a motor vehicle in a step-up or step-down manner, or can also be transmitted directly to drive wheels of a motor vehicle.

The drive unit according to the disclosure provides the advantage that due to the radial nesting of the electric rotary machines, considerably less installation space is required axially than in conventional drive units with two electric rotary machines, wherein the coolant supply device provided according to the disclosure ensures optimum cooling of the stators and the rotors of the two nested electric rotary machines.

Another aspect of the present disclosure is a drive assembly with a drive unit according to the disclosure and an internal combustion engine, which is coupled or can be coupled to the rotor of the first electric rotary machine in a non-rotatable manner by means of an output element of the internal combustion engine.

The drive assembly can comprise a vibration damper connected in a non-rotatable manner to the connection element of the drive unit and a housing element mechanically connected to the internal combustion engine, wherein the vibration damper is arranged in the housing element.

In this regard, the housing element is advantageously connected to the second housing of the drive unit.

It is also possible to mount the intermediate shaft and/or the wheel drive shaft axially in the housing element on the one hand and in the second housing on the other.

When operating a motor vehicle, in particular a hybrid vehicle, with a drive assembly according to the disclosure, comprising a drive unit according to the disclosure and an internal combustion engine, the following driving operating modes are, for example, enabled:

Electric driving and recuperation:

The separating clutch is open, decoupling the second electric rotary machine from the first electric rotary machine and the internal combustion engine. The second electric rotary machine is thus controlled separately as a traction machine or as a generator. The internal combustion engine and the first electric rotary machine are not in operation.

Serial driving and charging:

The separating clutch is open. The internal combustion engine is started by means of the first electric rotary machine, wherein the internal combustion engine can drive the first electric rotary machine and, consequently, the first electric rotary machine is controlled as a generator to charge the battery of the motor vehicle. The second electric rotary machine is controlled as a traction machine.

Parallel hybrid drive, charging, and boosting:

The separating clutch is closed, whereby the first electric rotary machine, the second electric rotary machine and the internal combustion engine are coupled to one another. The motor vehicle is driven by means of the internal combustion engine and/or one or both electric rotary machines. The two electric rotary machines can be controlled here as a traction machine or as a generator.

In a further embodiment, the drive assembly also comprises at least one wheel drive shaft, on which wheels of a motor vehicle equipped with the drive assembly are to be arranged, and which is connected to the second shaft of the drive unit via the gearbox of the drive unit, so that a rotary motion realized by the second shaft can be transmitted through the gearbox to the wheel drive shaft and thus to the wheels.

The coolant supply device of the drive unit is, in this regard, fluidically coupled to a coolant circuit of the drive assembly or is part of the coolant circuit of the drive assembly. A pump actuator causes a coolant to circulate in the cooling circuit, wherein a heat exchanger enables heat transfer.

The pump actuator can be mounted in the housing element and the heat exchanger can be arranged radially outside on the second housing.

The transport of a coolant in the cooling circuit can take place in such a manner that the pump actuator aspirates warm coolant from a so-called coolant sump or coolant reservoir, in which the coolant is collected/intermediately stored after heat absorption. The warm coolant is fed through the pump actuator to the heat exchanger, where it gives off heat. The now cooled coolant is fed via the second housing into the first housing and there to the coolant supply device and into the axially extending shaft flow channel in the first shaft.

BRIEF DESCRIPTION OF THE DRAWINGS

The disclosure described above is explained in detail below based on the relevant technical background with reference to the associated drawings, which show preferred embodiments. The disclosure is in no way restricted by the purely schematic drawings, although it should be noted that the exemplary embodiments shown in the drawings are not limited to the dimensions shown. In the drawings.

DETAILED DESCRIPTION

In FIGS. 1 to 4, the drive assembly is initially shown for the purpose of a general explanation without reference to the cooling or coolant supply device.

Figure 1:
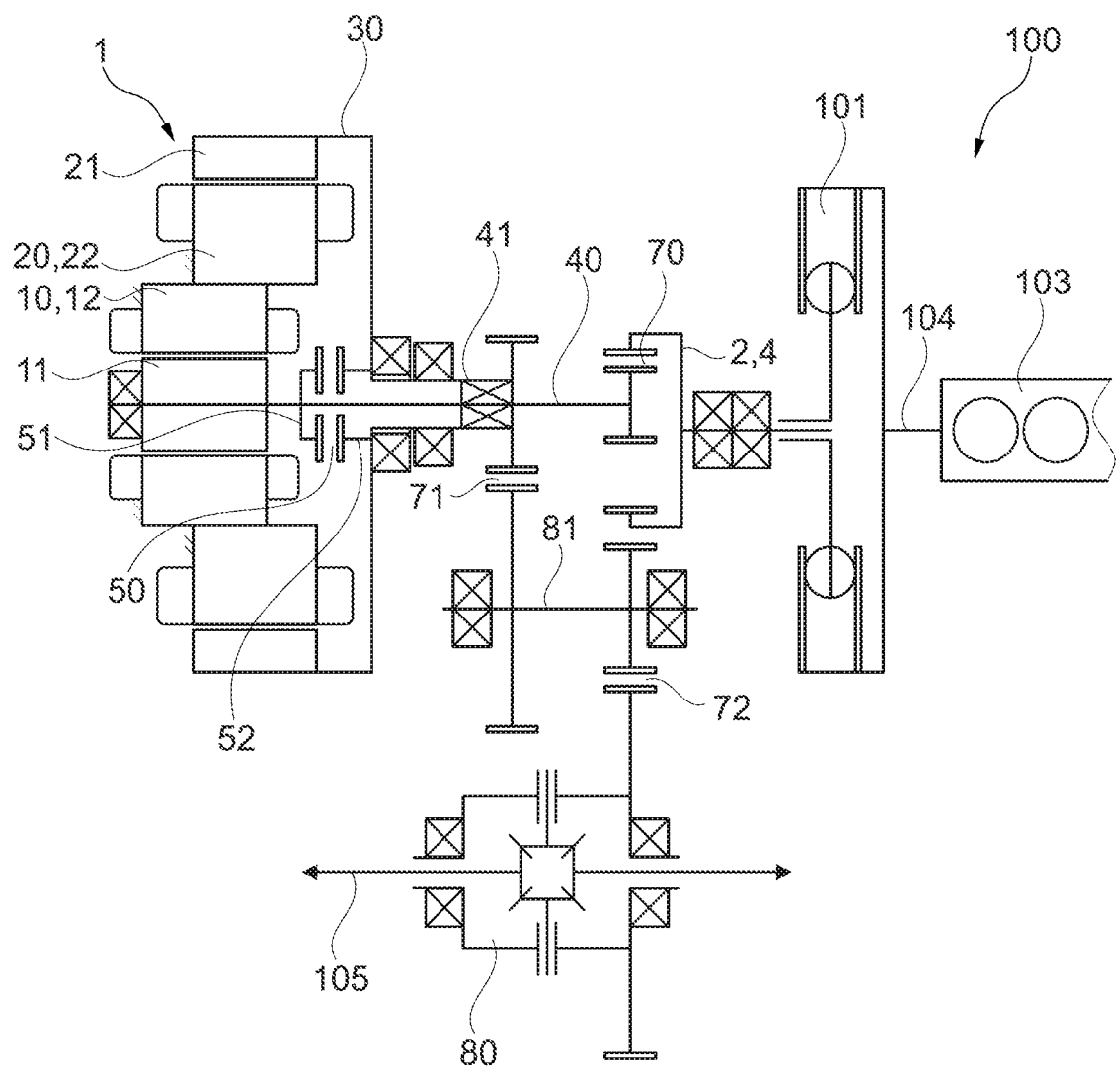
FIG. 1: shows a schematic representation of a drive assembly with a drive unit according to the disclosure.

FIG. 1 shows a schematic representation of a drive assembly 100 according to the disclosure with a drive unit 1 according to the disclosure.

The drive unit 1 comprises a first electric rotary machine 10, a second electric rotary machine 20, a first shaft 40, and a second shaft 41.

Further, the drive assembly 100 comprises an internal combustion engine 103 and a vibration damper 101, wherein an output element 104 of the internal combustion engine 103 is coupled to the vibration damper 101. The vibration damper 101 is also connected to a connection element 4 of the drive assembly 1, which functions as an input side 2 of the drive assembly 1. The internal combustion engine 103 is thus coupled to the drive assembly 1 via the vibration damper 104.

The connection element 4 is coupled to the first shaft 40 in such a manner that a first transmission stage 70 is formed between the connection element 4 and the first shaft 40.

A rotor 11 of the first electric rotary machine 10 is connected in a non-rotatable manner to the first shaft 40, and a rotor 21 of the second electric rotary machine 20 is connected in a non-rotatable manner to the second shaft 41.

The connection of the rotor 11 of the first electric rotary machine 10 to the first shaft 40 is realized in such a manner that the rotor 11 of the first electric rotary machine 10 is arranged directly on the first shaft 40. In contrast, the rotor 21 of the second electric rotary machine 20 is supported by a rotor carrier 30, and the rotor carrier 30 is connected to the second shaft 41.

The first electric rotary machine 10 is arranged radially as well as partly axially within an area radially delimited by the second electric rotary machine 20. In this regard, the first electric rotary machine 10 is designed as an internal rotor motor and the second electric rotary machine 20 is designed as an external rotor motor, wherein a stator 12 of the first electric rotary machine 10 and a stator 22 of the second electric rotary machine 20 are mechanically fixed to each other.

A separating clutch 50 of the drive unit 1 is connected with its input side 51 to the first shaft 40 and with its output side 52 to the second shaft 41. The separating clutch 50 thus serves to transmit torque between the first shaft 40 and the second shaft 41. Accordingly, the separating clutch 50 can be used to open or close a torque transmission path between the rotor 11 of the first electric rotary machine 10 and the rotor 21 of the second electric rotary machine 20.

The second shaft 41 is designed as a hollow shaft and the first shaft 40 runs radially inside the second shaft 41 in sections. The two shafts 40, 41 thus run coaxially with one another, wherein the rotors 11, 21 of the two electric rotary machines 10, 20 are also arranged coaxially to one another and coaxially to the shafts 40, 41.

The second shaft 41 is connected to an intermediate shaft 81 via a second transmission stage 71. In this regard, the intermediate shaft 81 runs parallel to the second shaft 41.

The intermediate shaft 81 is connected via a third transmission stage 72 to an input element of a differential gear 80 of the drive unit 1 for the purpose of transmitting torque. The differential gear 80 forms an output side 3 of the drive unit 1.

A wheel drive shaft 105, on which wheels of a motor vehicle equipped with the drive assembly 100 are to be arranged, forms the output of the differential gear 80, so that a rotary motion realized by the second shaft 41 can be transmitted via the second transmission stage 71 and the third transmission stage 72 and via the differential gear 80 to the wheel drive shaft 105 and thus to the wheels.

A torque provided by the internal combustion engine 103 is transmitted to the first shaft 40 of the drive unit 1 via the vibration damper 101 and via the first transmission stage 70. If the separating clutch 50 is open in this regard, the torque of the internal combustion engine 103 is only directed to the rotor 11 of the first electric rotary machine 10. In this manner, the first electric rotary machine 10 can be used in a generator operation to charge a battery. When the separating clutch 50 is closed, the torque provided by the internal combustion engine 103 is transmitted from the first shaft 40 to the second shaft 41. From the second shaft 41, the torque of the internal combustion engine 103 is transmitted via the second transmission stage 71 to the intermediate shaft 81 and via the third transmission stage 72 to the differential gear 80. Via the differential gear 80, the torque is transmitted by means of the wheel drive shaft 103 to wheels of a motor vehicle equipped with the drive assembly 100.

A torque provided by the rotor 11 of the first electric rotary machine 10 can be transmitted to the internal combustion engine 103 via the first transmission stage 70 when the separating clutch 50 is open. When the separating clutch 50 is closed, torque is transmitted via the second transmission stage 71 and the third transmission stage 72 to the differential gear 80 and thus to the wheel drive shaft 105.

A torque provided by the rotor 21 of the second electric rotary machine 20 is transmitted to the differential gear 80 and thus to the wheel drive shaft 105 via the second transmission stage 71 and the third transmission stage 72, independently of a switching condition of the separating clutch 50.

Accordingly, the drive assembly 100 can be operated in a variety of driving operating modes.

Figure 2:
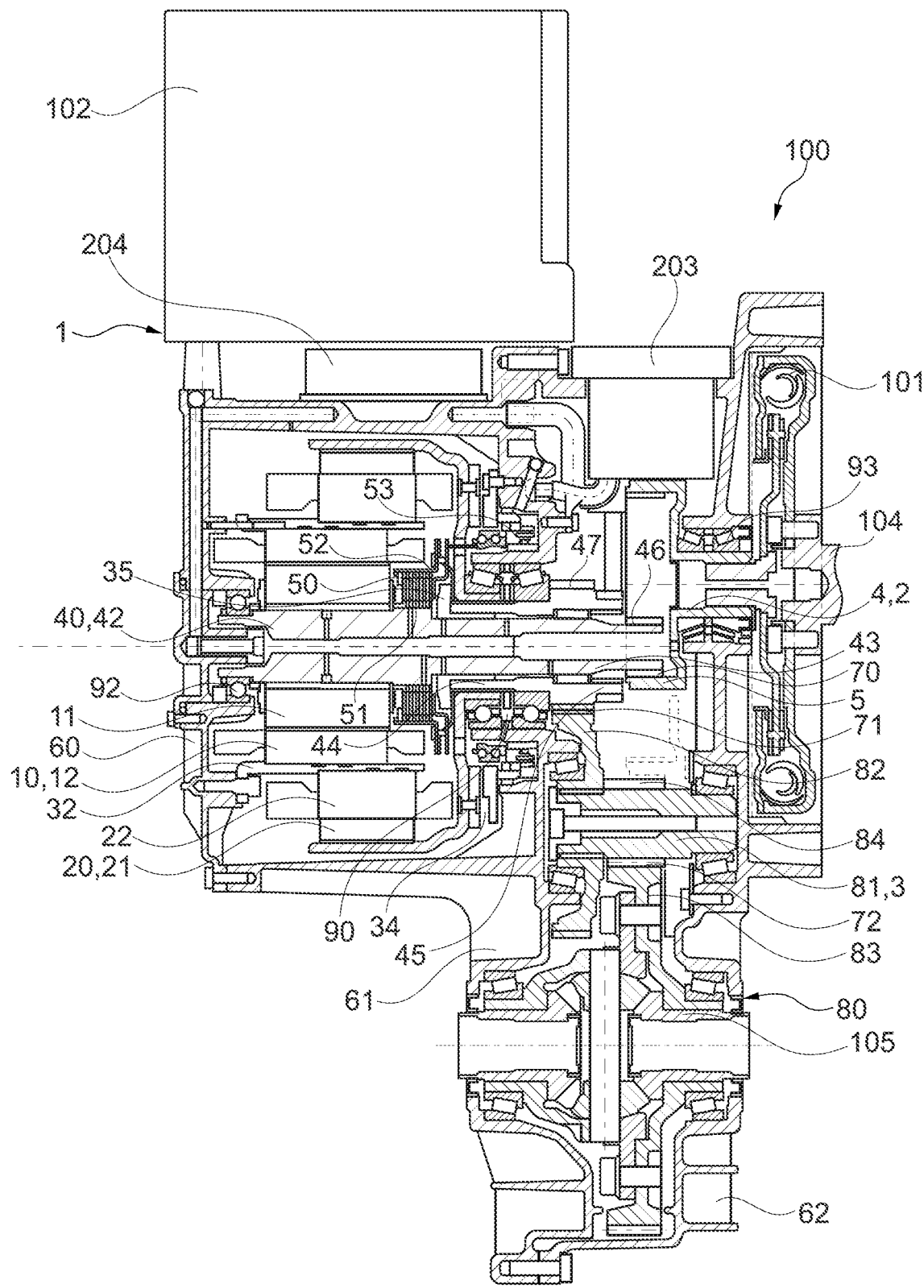
FIG. 2: shows a section of the drive assembly according to the disclosure in a sectional side view.

FIG. 2 shows a section of the drive assembly 100 according to the disclosure in a sectional side view.

FIG. 2 shows a more detailed illustration of individual components indicated in FIG. 1, wherein the internal combustion engine is not shown in FIG. 2 and the output element 104 of the internal combustion engine coupled to the vibration damper 101 is only partially shown.

In FIG. 2, a first housing 60, a second housing 61 and a housing element 62 can be seen, which are connected to one another and form an overall housing of the drive assembly 100 or drive unit 1. The first and second housings 60, 61 serve to house the two electric rotary machines 10, 20, wherein the housing element 62 serves to couple the first housing 60 and the second housing 61 to a housing of the internal combustion engine (not shown). For this purpose, the first housing 60 is fixedly connected to the second housing 61 in the axial direction, wherein the housing element 62 is fixedly connected to the second housing 61 on the side of the second housing 61 axially opposite the first housing 60.

The first shaft 40 has its first axial end portion 42 supported by a single-row support bearing 92 in the first housing 60, and its second axial end portion 43 supported by a needle bearing 91 radially on the inside of a second axial end portion 45 of the second shaft 41.

The second shaft 41 is supported with its first axial end portion 44 on the second housing 61 via a central bearing unit 90. This central bearing unit 90 comprises two coaxially arranged rolling bearings axially closely positioned side by side.

Further, a common stator carrier 32 supporting the stators 12, 22 of the electric rotary machines 10, 20 is fixedly connected to the first housing 60 so that the stators 12, 22 of the electric rotary machines 10, 20 are supported by the first housing 60. The rotor carrier 30 of the rotor 21 of the second electric rotary machine 20 is supported on the second housing 61 by means of a rolling bearing of the central bearing unit 90. An encoder element of a rotor position sensor 34 is also connected to the rotor carrier 30, wherein a detector element of the rotor position sensor 34 is connected to the second housing 61, so that a detection of an angular position and/or a rotational speed of the rotor 21 of the second electric rotary machine 20 or the rotor carrier 30 can be performed by the rotor position sensor 34.

In addition, the intermediate shaft 81 and the wheel drive shaft 105 are each supported in the second housing 61 on their axial side facing the electric rotary machines 10, 20 and are supported in the housing element 62 on their opposite axial side. The connection element 4 of the drive unit 1 is supported on the housing element 62 via a double-row bearing unit 93. This double-row bearing unit 93 comprises two coaxially arranged rolling bearings axially closely positioned side by side. The vibration damper 101 is arranged in the housing element 62.

The central bearing unit 90 and the double-row bearing unit 93 are each shown in different possible designs to illustrate their possible embodiments. The central bearing unit 90 is shown with tapered roller bearings and with angular contact ball bearings, wherein the double-row bearing unit 93 is shown with tapered roller bearings. However, as mentioned with respect to the central bearing unit 90, other bearings can be used here as well, such as angular contact ball bearings.

Further, power electronics 102 are arranged radially outside on the first and second housings 60, 61, wherein the power electronics 102 are configured to control the electric rotary machines 10, 20. A heat exchanger 204 of a cooling circuit for cooling at least one of the electric rotary machines 10, 20 is also arranged on the second housing 61 between the second housing 61 and the power electronics 102. A pump actuator 203 of this cooling circuit is supported by the housing element 62.

FIG. 2 also shows a detailed structure of the transmission stages 70, 71, 72.

The first transmission stage 70 is configured such that the connection element 4 comprises an internally toothed gear wheel 5 that meshes with an external toothing 46 on the second axial end portion 43 of the first shaft 40.

The second shaft 41 also has an external toothing 47 at its second axial end portion 45 with which it engages a first gear wheel 82, wherein the first gear wheel 82 is arranged in a non-rotatable manner on the intermediate shaft 81 so that the second transmission stage 71 is formed between the second shaft 41 and the intermediate shaft 81.

An external toothing 84 of the intermediate shaft 81 engages a second gear wheel 83 as an input element of the differential gear 80, forming the third transmission stage 72 between the intermediate shaft 81 and the differential gear 80.

The separating clutch 50 corresponds to a frictionally lockable multi-plate clutch, the input side 51 of which is formed by inner plates which are arranged axially adjacent to the rotor 11 of the first electric rotary machine 10 on the first shaft 40, wherein outer plates of the separating clutch 50 are connected to the second shaft 41 as the output side 52 thereof.

Radially outward of the central bearing unit 90, an actuation system 53 for actuating the separating clutch 50 is arranged on the second housing 61, wherein a pressure pot of the actuation system 53 axially engages through the rotor carrier 30 to transmit an actuating force provided by the actuation system 53 to the separating clutch 50 for closing thereof.

Furthermore, a locking screw 35 is provided, which is screwed into the second shaft 41 at the first axial end portion 44 thereof, so that a screw head of the locking screw 35 applies an axially acting preloading force to the rotor carrier 30 and the two rolling bearings of the central bearing unit 90, thereby securing the axial position of the rotor carrier 30 and the central bearing unit 90 with respect to the second shaft 41.

Figure 3:
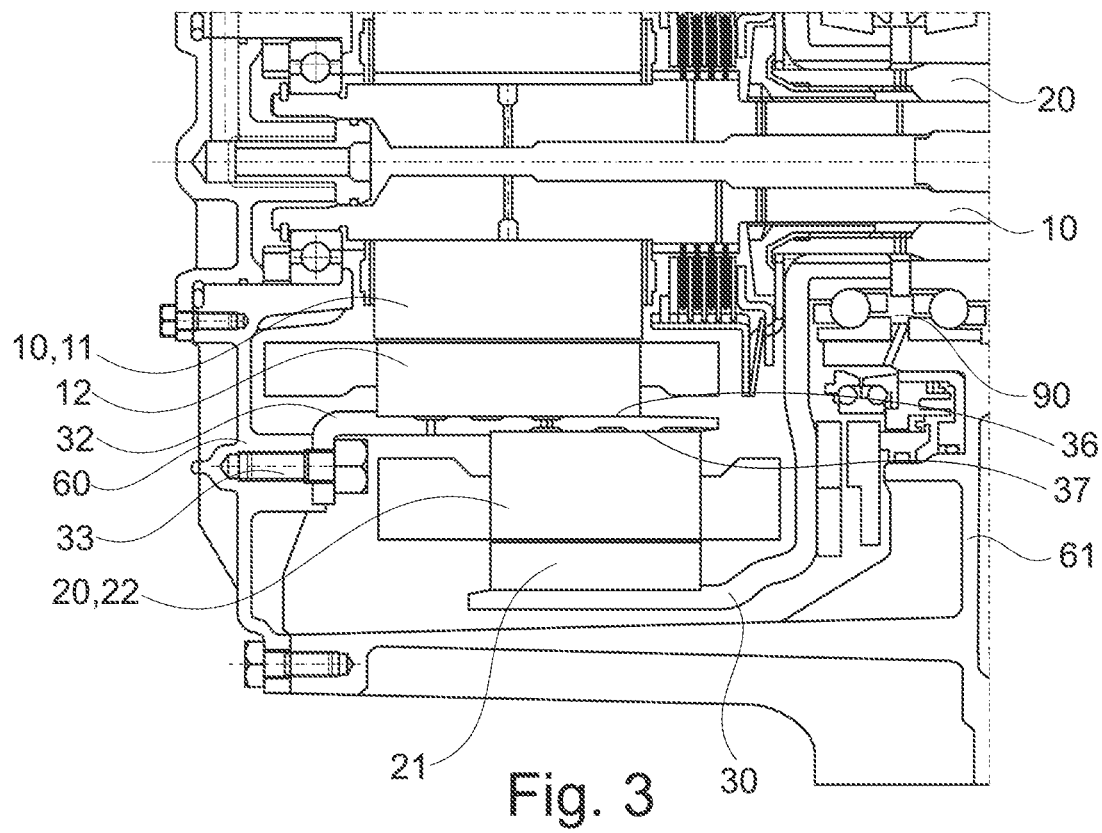
FIG. 3: shows a section of the drive unit according to the disclosure in the area of the electric rotary machines.

FIG. 3 shows a section of a drive unit 1 according to the disclosure in the area of the electric rotary machines 10, 20.

The section shows a drive unit 1, identical to the embodiment of the drive unit 1 in FIG. 2.

It can be seen in FIG. 3 that the common stator carrier 32 is connected to the first housing 60 by means of a carrier screw 33. For this purpose, the carrier screw 33 is guided axially through a radially extending section of the common stator carrier 32 and screwed into the first housing 60 in the axial direction.

In addition, the stator 12 of the first electric rotary machine 10 carried on the radially inner side 36 of the common stator carrier 32 is axially offset from the stator 22 of the second electric rotary machine 20 carried on the radially outer side 37 of the common stator carrier 32.

Figure 4:
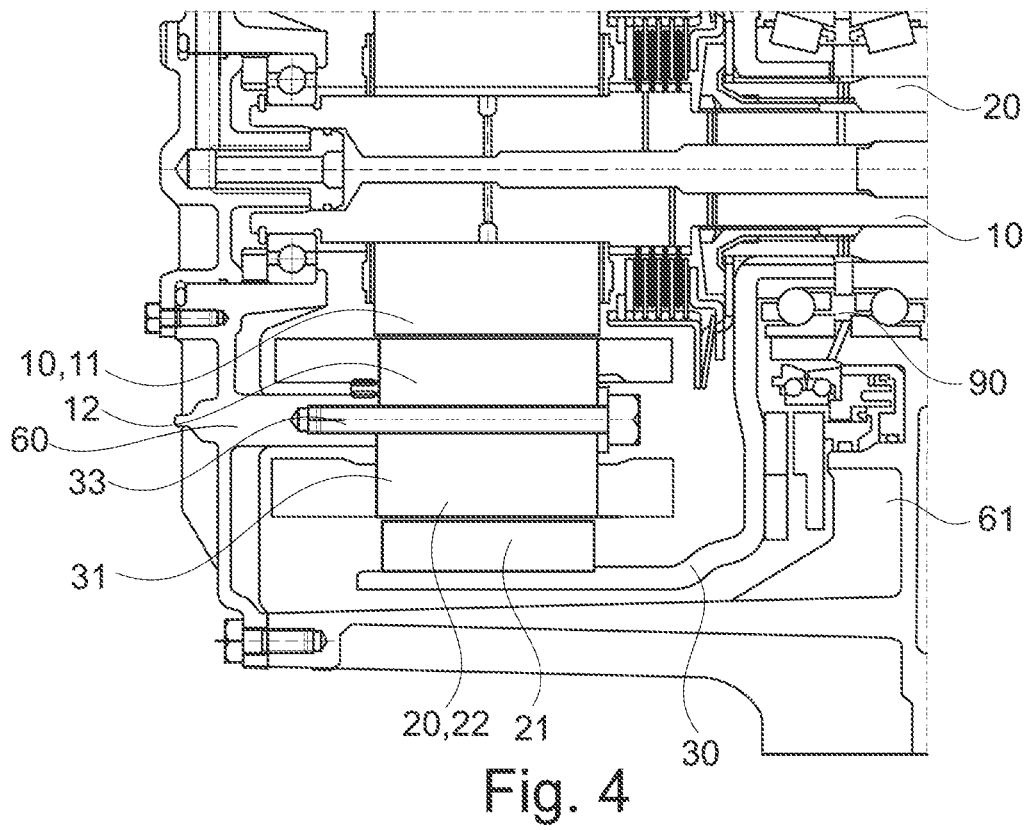
FIG. 4: shows a section of a drive unit according to the disclosure in the area of the electric rotary machines in an alternative embodiment.

As an alternative to the drive unit 1 of FIG. 3, FIG. 4 shows a section of a drive unit 1 according to the disclosure in the area of the electric rotary machines 10, 20 in an alternative embodiment.

In contrast to FIG. 3, the stators 12, 22 of the two electric rotary machines 10, 20 are integral components of a stator unit 31.

This stator unit 31 is fixed to the first housing 60 by a carrier screw 33, which passes through the entire stator unit 31 in the axial direction and is screwed into the first housing 60 in the axial direction. Thus, this alternative embodiment does not use an extra stator carrier between the individual stators 12, 22, but comprises a compact unit formed by the two stators 12, 22 only.

Figure 5:
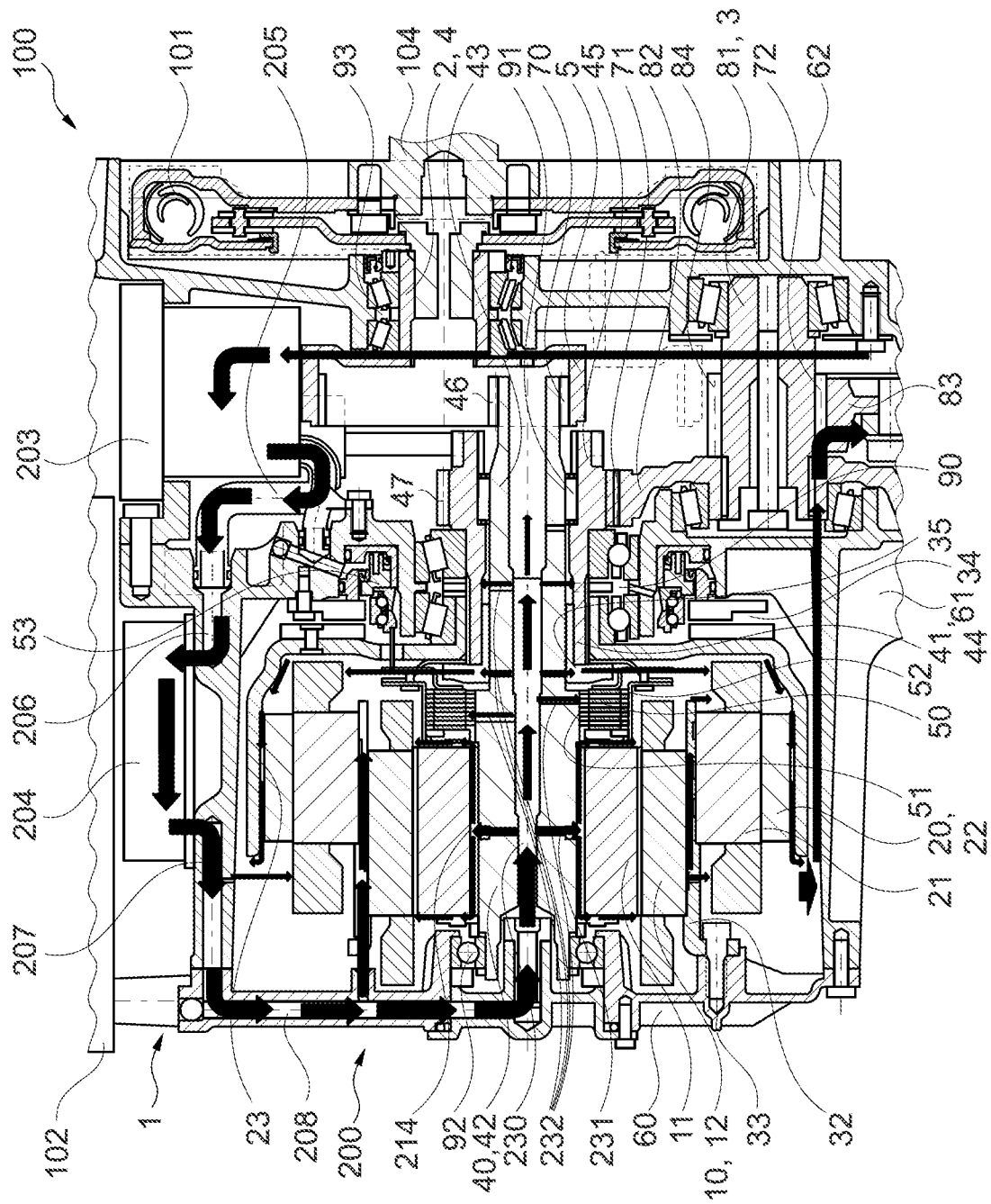
FIG. 5: shows a section of the drive assembly according to the disclosure with the drive unit according to the disclosure in a sectional side view with the coolant flow highlighted.
Figure 6:
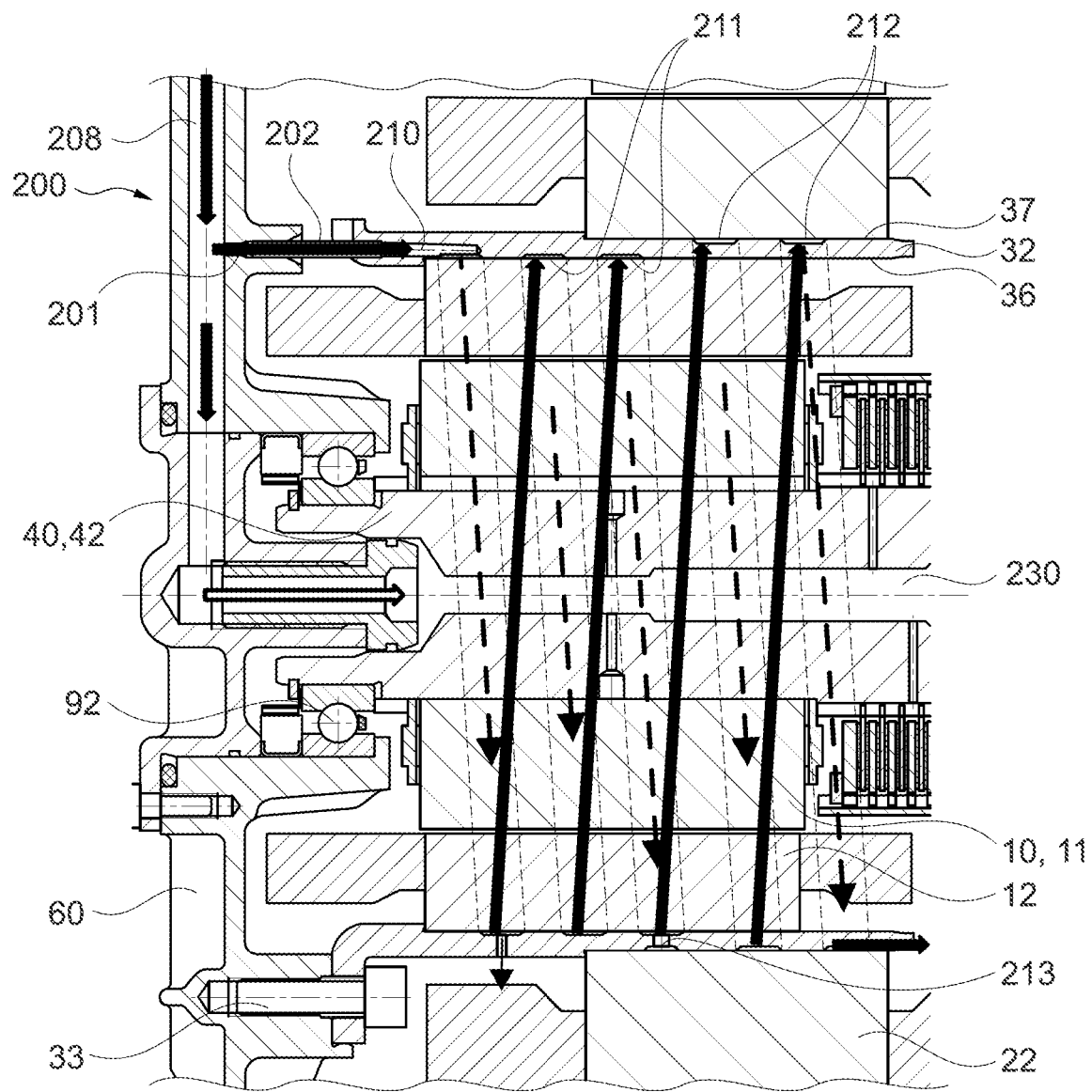
FIG. 6: shows a section of the drive unit according to the disclosure in the area of the electric rotary machines with the coolant flow highlighted.
Figure 7:
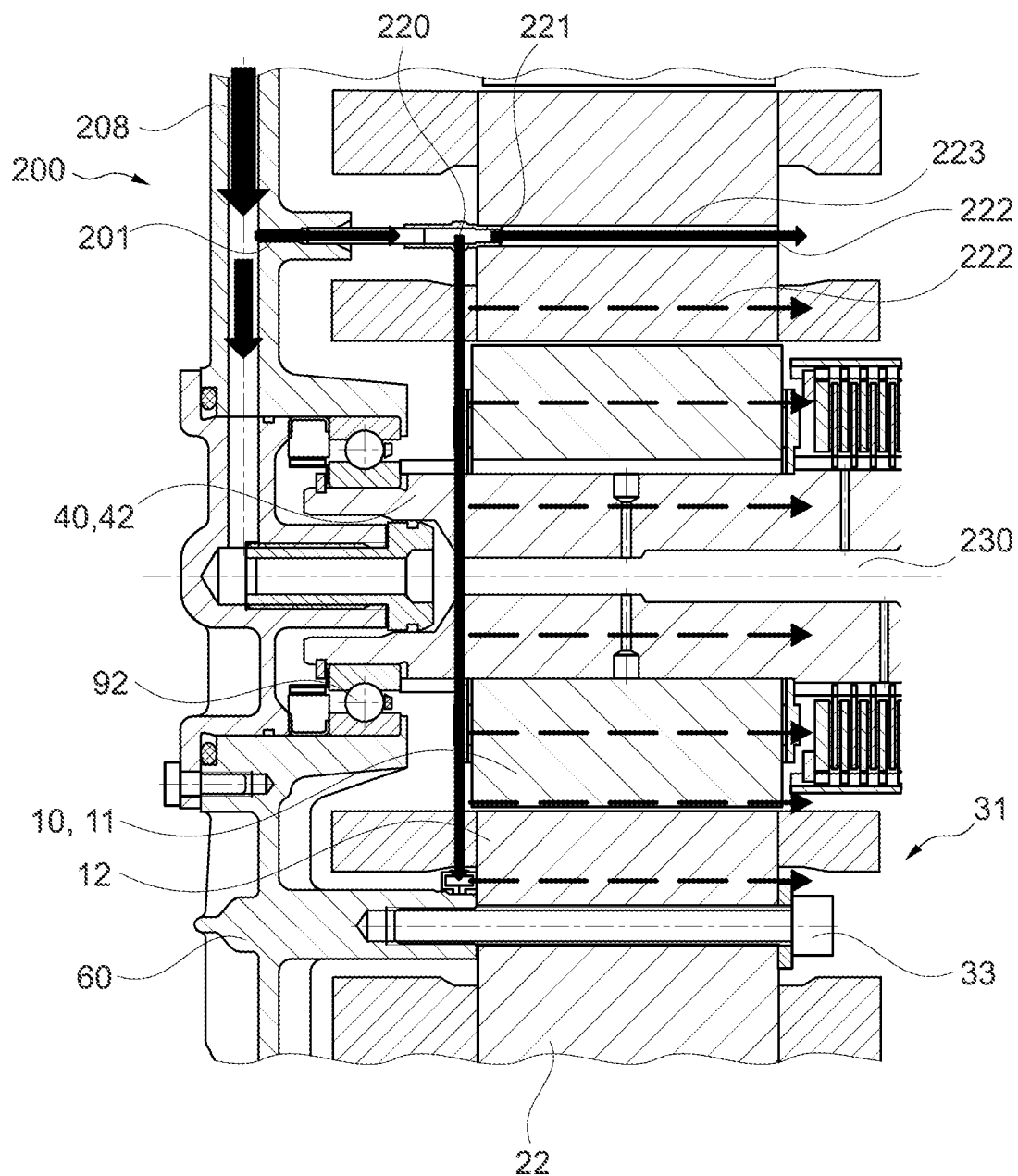
FIG. 7: shows a section of the drive unit according to the disclosure in the area of the electric rotary machines in the alternative embodiment with the coolant flow highlighted.

FIGS. 5 and 6 show the drive assembly according to the disclosure with the drive unit according to the disclosure and the cooling circuit illustrated by arrows. FIG. 7 shows the drive assembly according to the disclosure with the drive unit according to the disclosure in the alternative embodiment, also with the cooling circuit illustrated by arrows.

FIG. 5 essentially corresponds to FIG. 2, wherein the power electronics 102 are shown only partly and the differential gear is not shown at all.

FIG. 5 shows that by means of the pump actuator 203 as part of the cooling circuit, coolant can be transported to the heat exchanger 204 through a first guide channel 205 and a second guide channel 206.

For this purpose, the pump actuator 203 delivers warm coolant from a reservoir not shown here. The first guide channel 205 is formed as a tube arranged within the housing element 62, which is fluidically connected to the second guide channel 206 in the interior of the housing. The second guide channel 206 is formed as an integral component of the second housing 61 and extends substantially therein in the axial direction.

A hot coolant supplied from the pump actuator 203 to the heat exchanger 204 is cooled by the heat exchanger 204 and then guided to a third guide channel 207. Like the second guide channel 207, the third guide channel 207 is formed as an integral component of the second housing 61 and extends in a substantially axial direction.

The third guide channel 207 is fluidically connected to a fourth guide channel 208, wherein said fourth guide channel 208 extends in a substantially radial direction and is an integral component of the first housing 60.

The fourth guide channel 208 allows coolant cooled by the heat exchanger 204 to be guided to the stators 12, 22 of the two electric rotary machines 10, 20, which is shown in more detail in FIG. 6, and to be guided radially inside where the fourth guide channel 208 is fluidically coupled to a shaft flow channel 230 extending axially in the first shaft 40.

The shaft flow channel 230 is used to supply coolant to the rotors 11, 21 of the two rotary machines 10, 20, to the separating clutch 50 and to the central bearing unit 90.

For the purpose of supplying coolant to the rotor 11 of the first electric rotary machine 10, the first shaft 40 comprises radially extending, first transverse bores 231 which fluidically connect to the shaft flow channel 230 and which are positioned axially centrally with respect to the rotor 11 of the first electric rotary machine 10 and are thus superimposed by the rotor 11 of the first electric rotary machine 10 in the radial direction.

Radially between the first shaft 40 and the rotor 11 of the first electric rotary machine 10, a plurality of axial cooling channels 214 are also formed by the first shaft 40, the rotor 11, or the first shaft 40 and the rotor 11, extending from one end face of the rotor 11 to the opposite end face, and each fluidically coupled to at least one of the first transverse bores 231.

Accordingly, a coolant guided in the shaft flow channel 230 can pass through a first transverse bore 231 into an axial cooling channel 214 and thus to the rotor 11 of the first electric rotary machine 10. The axial cooling channel 214 distributes the coolant evenly in the axial direction along the radially inner side of the rotor 11 of the first electric rotary machine 10, thus realizing optimum cooling for the latter. The coolant emerges axially on both sides next to the rotor 11 of the first electric rotary machine 10 from the axial cooling channel 214 and is guided there along a respective end face of the rotor 11 radially outside to winding heads of the stator 12 of the first electric rotary machine 10 in order to cool them.

To supply coolant to the rotor 21 of the second electric rotary machine 20, to the separating clutch 50 and to the central bearing unit 90, the first shaft 40 also comprises radially extending, further transverse bores 232, which also connect fluidically to the shaft flow channel 230.

For this purpose, the further transverse bores 232 are arranged at different axial positions in the first shaft 40, wherein further transverse bores 232 for supplying coolant are radially superimposed by the separating clutch 50 or the central bearing unit 90 for cooling in a targeted manner.

The further transverse bores 232 for the purpose of supplying coolant to the rotor 21 of the second electric rotary machine 20 radially lean to an area which is partly delimited by the rotor carrier 30 carrying the rotor 21 of the second electric rotary machine 20. Coolant emerging from these further transverse bores 232 is carried radially outward by the centrifugal force and/or gravity, where the rotor carrier 30 of the rotor 21 of the second electric rotary machine 20 realizes a guidance of the coolant to the axial side of the rotor 21 facing away from the first housing 60.

In this regard, a plurality of grooves 23 are provided in the axial direction on the contact surface of the rotor 21 of the second electric rotary machine 20 on the rotor carrier 30, wherein the grooves are formed either by the rotor 21 or by the rotor carrier 30 or by the rotor 21 and the rotor carrier 30.

The grooves 23 thus allow axial distribution of the coolant in or on the rotor 21 of the second electric rotary machine 20.

A coolant reheated after cooling a respective unit collects in the second housing 61, from where it is returned to the reservoir.

FIG. 6 shows a section of the drive unit 1 according to the disclosure in the area of the electric rotary machines 10, 20. Supplementary to FIG. 5, FIG. 6 shows a detailed representation of the coolant flow for cooling the stators 12, 22 of both electric rotary machines 10, 20.

A coolant supply device 200 of the drive unit 1 is shown, by means of which coolant can be supplied axially between and/or into the stators 12, 22.

The section shows a drive unit 1 corresponding to the embodiment of the drive unit 1 in FIG. 3. This means that the common stator carrier 32 is fixedly connected to the first housing 60, the stator 12 of the first electric rotary machine 10 is arranged on the radially inner side 36 of the common stator carrier 32, and the stator 22 of the second electric rotary machine 20 is arranged on the radially outer side 37 of the common stator carrier 32.

In this regard, the fourth guide channel 208 is fluidically coupled to a distribution device 201 of the coolant supply device 200 as a component of the coolant supply device 200, wherein the distribution device 201 is configured as at least one axially extending channel in the first housing 60. The distribution device 201 is, in turn, fluidically coupled by means of at least one connecting sleeve 202 to at least one axial connecting channel 210 of the coolant supply device 200 formed in the stator carrier 32. For the purpose of fluidically connecting the distribution device 201 to the axial connecting channel 210, the connecting sleeve 202 is designed to be hollow-cylindrical in shape and has a smaller diameter than the distribution device 201 and the axial connecting channel 210, so that the connecting sleeve 202 is essentially inserted into the distribution device 201 and the axial connecting channel 210 partly in the axial direction to ensure a fluid-tight connection.

The axial connecting channel 210 is, in turn, fluidically connected to a radially inner helical channel 211 for conducting coolant, which is formed on the radially inner side 36 of the stator carrier 32. Furthermore, a radially outer helical channel 212 is formed on the radially outer side 37 of the stator carrier 32 for conducting coolant, wherein the radially inner helical channel 211 is connected to the radially outer helical channel 212 via a radial connecting channel 213 through the stator carrier 32.

The two helical channels 211, 212 are formed by a respective groove on the respective side of the stator carrier 32 which is closed on the outside by the respective stator 12, 22 being in contact with the respective side of the stator carrier 32, thus forming a channel.

The radially inner helical channel 211 has such an axial extension or axial position on the stator carrier 32 that it extends substantially axially along the stator 12 of the first electric rotary machine 10, which is supported by the stator carrier 32 on its radially inner side 36. Accordingly, the radially outer helical channel 212 has such an axial extension or axial position on the stator carrier 32 that it extends substantially axially along the stator 22 of the second electric rotary machine 20, which is supported by the stator carrier 32 on its radially outer side 37.

Thus, in this embodiment, efficient cooling of the stator 12 of the first electric rotary machine 10 can be realized by means of coolant guided in the radially inner helical channel 211, and efficient cooling of the stator 22 of the second electric rotary machine 20 can be realized by means of coolant guided in the radially outer helical channel 212.

FIG. 7 shows a section of the drive unit 1 according to the disclosure in the area of the electric rotary machines 10, 20 in the alternative embodiment. FIG. 7 shows a coolant flow in a drive unit according to FIG. 4.

A coolant supply device 200 of the drive unit 1 is shown, wherein this comprises an annular channel 220 which has a plurality of axial outlets 221 generating partial coolant flows 222, wherein a flow channel 223 in the stator unit 31 is fluidically coupled to a respective axial outlet 221.

A respective such flow channel 223 is thereby configured as an axial bore, wherein the flow channels 223 are arranged radially between the stator 12 of the first electric rotary machine 10 and the stator 22 of the second electric rotary machine 20. Thus, coolant can be guided in the stator unit 31 in such a manner that optimum cooling of both stators 12, 22 is realized in an essentially equal manner.

The axial outlets 221 are, in this regard, formed at substantially regular angular intervals distributed around the circumference from the annular channel 220, so that the most uniform possible distribution of partial coolant flows 222 and thus optimum cooling can be realized along the entire circumference of the stator 12 of the first electric rotary machine 10 and along the entire circumference of the stator 22 of the second electric rotary machine 20.

An optimal cooling function, and thus an efficient operation, can be ensured with an inexpensive design and in a space-saving manner by virtue of the drive unit and the drive assembly according to the disclosure.

LIST OF REFERENCE SYMBOLS

1 Drive unit
2 Input side of the drive unit
3 Output side of the drive unit
4 Connection element of the drive unit
5 Internally toothed gear of the connection element
10 First electric rotary machine
11 Rotor of the first electric rotary machine
12 Stator of the first electric rotary machine
20 Second electric rotary machine
21 Rotor of the second electric rotary machine
22 Stator of the second electric rotary machine
23 Groove
30 Rotor carrier of the second electric rotary machine
31 Stator unit
32 Common stator carrier
33 Carrier screw
34 Rotor position sensor
35 Locking screw
36 Radially inner side of the stator carrier
37 Radially outer side of the stator carrier
40 First shaft
41 Second shaft
42 First axial end portion of the first shaft
43 Second axial end portion of first shaft
44 First axial end portion of second shaft
45 Second axial end portion of the second shaft
46 External toothing of the first shaft
47 External toothing of the second shaft
50 Separating clutch
51 Input side of the separating clutch
52 Output side of the separating clutch
53 Actuation system
60 First housing
61 Second housing
62 Housing element
70 First transmission stage
71 Second transmission stage
72 Third transmission stage
80 Differential gear
81 Intermediate shaft
82 First gear wheel
83 Second gear wheel
84 External toothing of the intermediate shaft
90 Central bearing unit
91 Needle bearing
92 Support bearing
93 Double-row bearing unit
100 Drive assembly
101 Vibration damper
102 Power electronics
103 Internal combustion engine
104 Output element of the internal combustion engine
105 Wheel drive shaft
200 Coolant supply device
201 Distribution device
202 Connecting sleeve
203 Pump actuator
204 Heat exchanger
205 First guide channel
206 Second guide channel
207 Third guide channel
208 Fourth guide channel
210 Axial connecting channel
211 Radially inner helical channel
212 Radially outer helical channel
213 Radial connecting channel
214 Axial cooling channel
220 Annular channel
221 Axial outlet
222 Partial coolant flow
223 Flow channel
230 Shaft flow channel
231 First transverse bore
232 Further transverse bore

The invention claimed is:

1. A drive unit for a powertrain of an electrically drivable motor vehicle, comprising: a first electric rotary machine and a second electric rotary machine as well as a first shaft and a second shaft, wherein a rotor of the first electric rotary machine is connected in a non-rotatable manner to the first shaft and a rotor of the second electric rotary machine is connected in a non-rotatable manner to the second shaft, wherein the first electric rotary machine is arranged at least partly radially and axially within an area radially delimited by the second electric rotary machine, wherein a stator of the first electric rotary machine and a stator of the second electric rotary machine are mechanically fixed to each other, wherein a coolant supply device is arranged adjacently to the stators of the first and second electric rotary machines in an axial direction and by which coolant is supplied axially between and/or into the stators of the first and second electric rotary machines, wherein the first shaft has an axially extending shaft flow channel which is adjoined by at least one first transverse bore with a radial extension through which the coolant is supplied from the shaft flow channel to the rotor of the first electric rotary machine.

2. The drive unit according to claim 1, wherein the stators of the first and second electric rotary machines are arranged on a common stator carrier, wherein the coolant is supplied to the stator carrier by the coolant supply device and the stator carrier is configured to distribute the coolant in the axial direction.

3. The drive unit according to claim 2, wherein the stator carrier forms a helical channel on a radially inner side and/or on a radially outer side for conducting coolant.

4. The drive unit according to claim 3, wherein when the helical channel is arranged both on the radially inner side and on the radially outer side of the stator carrier, at least one radial connecting channel is provided between the helical channel on the radially inner side and the helical channel on the radially outer side.

5. The drive unit according to claim 2, wherein the coolant supply device comprises a distribution device arranged axially adjacent to the first and second electric rotary machines for supplying coolant to the stator carrier, wherein the distribution device is fluidically coupled by at least one connecting sleeve to at least one connecting channel formed axially in the stator carrier.

6. The drive unit according to claim 1, wherein the stators of the first and second electric rotary machines are integral components of a stator unit, wherein the coolant supply device comprises an annular channel having a plurality of axial outlets generating partial coolant flows to which flow channels in at least one of the stators are fluidically coupled.

7. The drive unit according to claim 1, wherein the rotor of the second electric rotary machine is rotatably mounted by a rotor carrier, wherein the rotor carrier has grooves or bores for axial distribution of the coolant in or on the rotor of the second electric rotary machine.

8. The drive unit according to claim 1, wherein at least one further transverse bore is formed in the first shaft for outflow of the coolant axially adjacent to the first and second electric rotary machines.

9. A drive assembly with a drive unit according to claim 1, and with an internal combustion engine which is coupled in a non-rotatable manner to the rotor of the first electric rotary machine by an output element of the internal combustion engine.

10. The drive unit according to claim 1, wherein the first electric rotary machine is designed as an internal rotor motor and the second electric rotary machine is designed as an external rotor motor.

11. A drive unit for a powertrain of an electrically drivable motor vehicle, comprising:
- a housing;
- a first electric rotary machine having a first rotor and a first stator;
- a second electric rotary machine having a second rotor and a second stator, wherein the first rotor is connected in a non-rotatable manner to a first shaft and the second rotor is connected in a non-rotatable manner to a second shaft, wherein the first electric rotary machine is arranged at least partly radially and axially within an area radially delimited by the second electric rotary machine;
- a stator carrier fixed to the housing, wherein the first stator is arranged on a radially inner side of the stator carrier and the second stator is arranged on a radially outer side of the stator carrier; and
- a coolant supply device arranged adjacently to the first and second stators in an axial direction, wherein the coolant supply device is configured to supply coolant to the stator carrier, wherein a helical channel is arranged both on the radially inner side and on the radially outer side of the stator carrier, and at least one radial connecting channel is provided between the helical channel on the radially inner side and the helical channel on the radially outer side.

12. The drive unit according to claim 11, wherein the coolant supply device comprises a distribution device arranged axially adjacent to the first and second electric rotary machines for supplying the coolant to the stator carrier, wherein the distribution device is fluidically coupled by at least one connecting sleeve to at least one connecting channel formed axially in the stator carrier.

* * * * *